United States Patent
Gazzard

(10) Patent No.: US 8,149,787 B2
(45) Date of Patent: *Apr. 3, 2012

(54) METHOD AND SYSTEM FOR COORDINATING OPERATION MODES OF A GPRS NETWORK

(75) Inventor: Daryl Gazzard, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 78 days.

This patent is subject to a terminal disclaimer.

(21) Appl. No.: 12/469,120

(22) Filed: May 20, 2009

(65) Prior Publication Data

US 2009/0225664 A1 Sep. 10, 2009

Related U.S. Application Data

(63) Continuation of application No. 10/735,673, filed on Dec. 16, 2003, now Pat. No. 7,551,583.

(51) Int. Cl.
*H04W 4/00* (2009.01)

(52) U.S. Cl. ........................................ 370/331; 455/423

(58) Field of Classification Search ............... 370/230.1, 370/252, 331, 353, 456, 338, 352, 553, 458, 370/567; 455/423, 426.1, 433, 445, 456.1, 455/458, 466, 552; 709/223
See application file for complete search history.

(56) References Cited

U.S. PATENT DOCUMENTS

| | | | | |
|---|---|---|---|---|
| 6,370,390 B1* | 4/2002 | Salin et al. | ..... | 455/466 |
| 6,847,610 B1* | 1/2005 | Suumaki et al. | ..... | 370/230.1 |
| 6,888,822 B2* | 5/2005 | Svensson et al. | ..... | 370/353 |
| 6,996,092 B1* | 2/2006 | Maguire et al. | ..... | 370/356 |
| 7,006,478 B1* | 2/2006 | Mizell et al. | ..... | 370/338 |
| 7,328,008 B2* | 2/2008 | Bjorken | ..... | 455/423 |
| 7,346,031 B2* | 3/2008 | Demarez et al. | ..... | 370/331 |
| 2001/0049731 A1* | 12/2001 | Kuusinen et al. | ..... | 709/223 |
| 2002/0006125 A1* | 1/2002 | Josse et al. | ..... | 370/354 |
| 2002/0061756 A1* | 5/2002 | Bleckert et al. | ..... | 455/458 |
| 2002/0122401 A1* | 9/2002 | Xiang et al. | ..... | 370/338 |
| 2002/0137532 A1* | 9/2002 | Landais et al. | ..... | 455/466 |
| 2002/0151307 A1* | 10/2002 | Demarez et al. | ..... | 455/445 |
| 2003/0148785 A1* | 8/2003 | Mangal et al. | ..... | 455/552 |
| 2004/0017798 A1* | 1/2004 | Hurtta et al. | ..... | 370/352 |

\* cited by examiner

*Primary Examiner* — Aung S Moe
*Assistant Examiner* — Awet Haile
(74) *Attorney, Agent, or Firm* — Parks IP Law LLC; Mickki D. Murray, Esq.

(57) ABSTRACT

A system and method for coordinating network operation modes of a GPRS network is disclosed. The system includes a database storing a preferred list of network operation modes of the GPRS network that a mobile subscriber registered for. A SGSN detects the status of an interface for GPRS packet data services and reports the status to a BSC. BSC in turn decides which network operation mode to use based on the preferred list. The GPRS network is then switched to the preferred network operation mode.

17 Claims, 9 Drawing Sheets

- - - - - - Data Transfer Route

METHOD AND SYSTEM FOR COORDINATING OPERATION MODES OF A GPRS NETWORK

CROSS-REFERENCE TO RELATED APPLICATIONS

This application is a continuation of U.S. patent application Ser. No. 10/735,673, filed Dec. 16, 2003, and issued as U.S. Pat. No. 7,551,583 on Jun. 23, 2009.

FIELD OF THE INVENTION

The present invention relates generally to communications methods and systems, and more particularly, to providing selections of operation modes of such communications systems.

BACKGROUND

A General Packet Radio System ("GPRS") is a service that provides data packet communications for mobile Global system for Mobile Communications (GSM) and time-division multiple access (TDMA) users. In addition to GSM, GPRS also provides services to other digital cellular networks, such as DCS and PCS. As is known, GPRS uses this packet-mode technique to transfer high-speed and low-speed data and signaling in an efficient manner over GSM radio networks.

GPRS provides a variety of new and unique services to mobile wireless subscribers. For example, GPRS can maintain constant voice and data communications while mobile subscribers are in transit. Subscribers also are enabled to obtain connectivity whenever needed, regardless of location and without a lengthy login session. Via a GPRS mobile telephone, a subscriber can maintain an online connection while initiating a communication, without an overhead of setting up a data call. Finally, localization enables subscribers to obtain information that is relevant to their respective current locations. For example, GPRS enables location-based services that provide information about weather, traffic, restaurants, or retail stores, based on a subscriber's location at a particular moment in time.

FIG. 1 illustrates a basic architecture of a GPRS network 100 and a data transfer route in the GPRS network. The GPRS network attempts to reuse the existing GSM network element as much as possible. In order to effectively build a packet-based mobile cellular network, some new network elements, interfaces and protocols that handle packet traffic are also required. For example, the exiting Mobile Station Switch Centers ("MSC's") are based upon circuit-switched central-office technology and cannot handle packet traffic. Therefore, enabling GPRS on a GSM network requires the addition of two core modules, a Serving GPRS Service Node ("SGSN") 110 and a Gateway GPRS Service Node ("GGSN") 112, as shown in FIG. 1. GGSN 112 acts as a gateway between GPRS network 100 and an external IP network 114 such as an Internet or an x.25 Network, or another GPRS network (to facilitate GPRS roaming), and is connected with SGSN 110 via an IP-based GPRS backbone network 124. SGSN 110 is at the same level as MSC 118, and can be viewed as a "packet-switched MSC" (mobile station switch center). SGSN 110 provides packet routings to and from its service area for all MS's in that service area. SGSN 110 also detects new GPRS MS's in a given service area, processes registration of new MSs, and keeps a record of their respective locations inside the given area.

MS 102 is physical equipment used by the mobile subscribers, such as a mobile telephone or a laptop computer, which is GPRS-attached and can handle an enhanced air interface in GPRS network 100 and can packetize traffic directly. The GPRS-attached MSs may include a high-speed version of current telephones to support high-speed data access, a PDA (Packet Data Access) device with an embedded GSM telephone, and PC cards for laptop computers. All MS's profiles are preserved in home location registers ("HLR") 120 that are accessible by SGSN 110 via local GSM MSC 118. A logical link (e.g., interface Gs) is established and maintained between a MS and a specific SGSN in each mobile network. At the end of transmission or when the MS moves out of the area of the specific SGSN, the logical link and the associated resources can be reallocated.

SGSN 110 is also coupled to a BSC (Base Station Controller) 106 via a Frame Relay connection. BSC 106 manages radio resources including Base Transceiver Station ("BTS") 104. BTS 104 is physical equipment, such as a radio tower, that is used to transmit radio frequencies over an air interface. The BSC 106 may be connected to several BTS's. Each BTS may serve more than one MS. The BSC and BTS, as a whole, are generally referred to as a BSS (Base Station System). To be utilized in the GPRS network, BSC 106 is linked to a Packet Control Unit ("PCU") 108 that provides a physical and logical data interface out of the BSS for packet data traffic. PCU 108 converts packet data to/from SGSN 110 into a format that can be transferred to server 116/MS 102 and implements quality of service (QoS) measurements. For example, when either voice or data traffic is originated at the mobile subscriber, it is transported over the air interface to BTS 104, and from BTS 104 to BSC 106 in the same way as in a standard GSM call. However, at the output of BSC 106, the traffic is separated. Circuit-switched voice is sent to MSC 118 via circuit-switched channels (through interface A) per standard GSM, and data is sent to SGSN 110 via PCU 108 over the Frame Relay Interface (through interface Gb) and packet-switched signaling channels (through interface Gs).

Currently, the GPRS network is designed to operate in three network operation modes (NOM1, NOM2, and NOM 3), which are shown in FIGS. 2 and 3. The network operation mode of the GPRS network is indicated by a parameter transmitted in system information messages within a cell that dictates to a GPRS MS where to listen for paging messages and how to signal towards the core network. The network operation mode represents the capabilities of the GPRS network. On NOM1 network, a MS can simultaneously establish circuit-switched (i.e., voice) and packet-switched (i.e., data) connections. On NOM2 network, the MS can remain attached to the GPRS network, but it cannot transmit or receive packet data at the same time. On NOM3 network, the MS can only establish either the circuit-switched or the packet-switched connection. That is, the MS needs to disconnect with one connection to establish the other.

There are also three classes of GPRS MS's, Class A, B, or C, for use in the above-mentioned three GPRS operation modes. These various GPRS MS's support various services. For example, a class A MS supports GPRS and other GSM services (such as SMS and voice) simultaneously, such that a class A MS can use circuit-switched voice and GPRS data services at the same time. Therefore, the class A MS can fully use the NOM1 network and is also suitable for operating in the NOM 2 and NOM 3 network. A class B MS can monitor GSM and GPRS channels simultaneously, but can only support one of these services at one time. That is, the class B MS can simultaneously register circuit-switched voice and packet-switch data services but may only use one kind of service at a time. Therefore, the class B MS can be operable in NOM 2 and NOM 3 of the GPRS network. A class C MS can only support non-simultaneous attach. The subscriber must select which service to connect to Therefore, a class C MS can make or receive calls from only the manually (or default) selective service. The service that is not selected is not reachable. The class C MS thus is only operable in NOM3 of the GPRS network.

A GPRS MS, in either class, has three states: idle, standby, and active. Data is transmitted between a MS and the GPRS network only when the MS is in the active state because in the active state, the GPRS network knows the location of the MS. However, in the standby state, the location of the MS is known only as to which routing area it is in. (Each routing area may include more than one cell within a GSM location area.) Therefore, when the network sends a packet to a MS that is in the standby state, the MS must be paged. The network first sends a paging message to a MSC within a location area where the MS is located. The MSC then sends another paging message to the SGSN. Because the SGSN knows the routing area (that is a subset of the location area) in which the MS is located, a packet paging message is then sent from the SGSN to that routing area. After receiving the packet paging message, the MS gives its cell location to the SGSN to establish the active state.

FIG. 2 is a diagram showing the first network operation mode NOM1 of the GPRS network, in which GRPS MS 201 is attached to, through BSC 202, both GPRS 204 via interfaces Gb and Gs and to other GSM services through MSC 203 via interface A, and MS 201 supports simultaneous operation of GPRS and other GSM services. As shown, in NOM1, the network sends all paging messages for GRPS MS 201 either on a Common Control Channel (CCCH) or the GPRS paging channel or on a GRPS traffic channel (if a data transfer is in progress), such as interfaces Gs and Gb. MS 201 only needs to monitor one paging channel thus allowing it to "sleep" longer. Further, the paging load is reduced since paging is performed on the routing area level.

FIG. 3 is a diagram illustrating the second and third network operation modes NOM2 and NOM3 of the GPRS network, in which GPRS MS 301 is attached to, through BSC 302, both GPRS 304 via interface Gb and other GSM services through MSC 303 via interface A and can only operate one set of services at a time. In NOM2, the network sends all paging messages for GPRS MS 301 out on the CCCH. The MS must monitor this channel even when allocated a GPRS data channel. The CS paging occurs at the location area level. In NOM 3, the network sends out the CS paging for GPRS MS 301 on the CCCH, and GPRS paging out on a Packet Paging channel (PPCH) through interface A, if allocated, or the CCCH. If PPCH are present in the cell, then MS 301 must monitor both the CCCH and the PPCH channels. The CS paging occurs at the location area level.

The primary difference between NOM1, NOM2 and NOM3 is that paging and signaling coordinate in NOM1 to occur between MSC 203 and SGSN 204. The primary difference between NOM2 and NOM3 is that in NOM 2, the GRPS MS 301 can be required to monitor different paging channels.

Currently, the MS can only be used in one operation mode of the GPRS network, based upon what service the MS subscriber registers for. That is, if the subscriber registers to use the service of NOM1, he/she cannot use the service of NOM2 or NOM3. Taking NOM 1 of FIG. 2 as an example, if the MS subscriber registers to use the first operation mode (NOM1), the subscriber can only use circuit-switched channels and packet-switched channels provided by GPRS 203 to deliver voice signals and packet data, respectively, i.e., through interfaces Gs and Gb. When interface Gs fails to operate for some reason, such as network problems and transport problems, the paging message sent from MSC 204 cannot be transmitted to the GPRS 203, causing MS 201 fails to receive calls, even though PPCH in interface A is available, because the GPRS network is not capable of switching the operation mode as needed.

Accordingly, a communications system and method that provides more flexible communications service to MS subscribers is thus desirable.

SUMMARY OF THE INVENTION

An object of the present invention is to provide a method and system for coordinating operation modes of a GPRS network. The present invention can automatically switch the operation mode of the GPRS network based on the status of an interface between a MSC and a SGSN so that the GPRS network can provide more flexible and effective communications services.

In accordance with an embodiment of the present invention, a MS subscriber registers his/her preferred list of operation modes when he/she subscribes to services of a GPRS network. The preferred list can be sent from the MS to a BSC when the MS conducts a communication with the BSC and can be stored in the BSC. When a first preferred operation mode is unavailable for delivering paging messages, the BSC instructs the network to route the paging messages through a second preferred operation mode. In an alternative embodiment, the preferred list can be stored in a database of a MSC, which is accessible by the SGSN for deciding a substitute operation mode when the first preferred operation mode is unavailable.

In accordance with an embodiment of the present invention, a method for coordinating operation modes of a GPRS network comprises transmitting a paging message to a mobile subscriber through a primary network operation mode that the mobile subscriber is registered for the GPRS network. If the primary network operation mode fails, the method automatically switches the transmission of the paging message through a secondary network operation mode that the mobile subscriber is registered for. The method switches back the transmission of further paging messages through the primary network operation mode when the primary network operation mode is recovered.

In accordance with another embodiment of the present invention, a method for coordinating operation modes of a GPRS network comprises transmitting a paging message to a mobile subscriber via one of a first routing and a second routing based on a preferred list of the mobile subscriber. In the first routing, the paging message is sent via a first interface and a second interface. In the second routing, the paging message is sent via a third interface. In the case that the first routing is selected as a primary operating mode and the second routing is selected as a secondary operating mode, if the first routing is unavailable for transmitting the paging message, the method transmits the paging message to the mobile subscriber via the second routing. The method then transmits the paging messages via the first routing after the first routing is recovered.

The present invention further provides a system for coordinating operation modes of a GPRS network. The system comprises a MSC for transmitting/receiving calls to/from the mobile subscriber, a BSC for managing the calls transmitted/received to/from the mobile subscriber, a SGSN between the mobile subscribers and the MSC, and a database for storing a preferred list of network operation modes of the GPRS network that the mobile subscriber registers. According to the system, the network operation modes of the GPRS network can be automatically switched according to the registered preferred list of network operation modes based on the interface status between the MSC and the SGSN.

DETAILED DESCRIPTION

Figure 1:
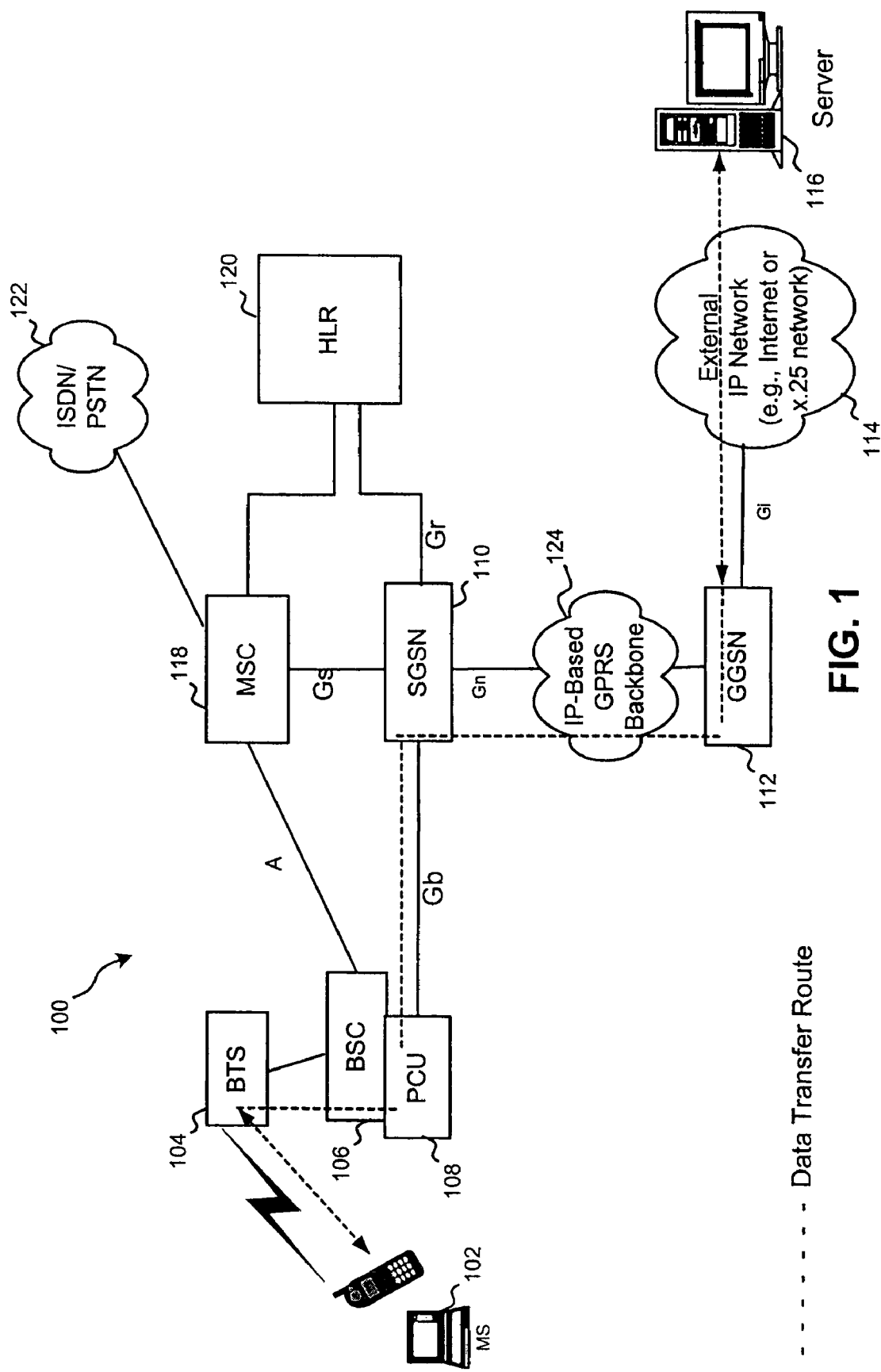
FIG. 1 is a block diagram of an exemplary GPRS network.
Figure 2:
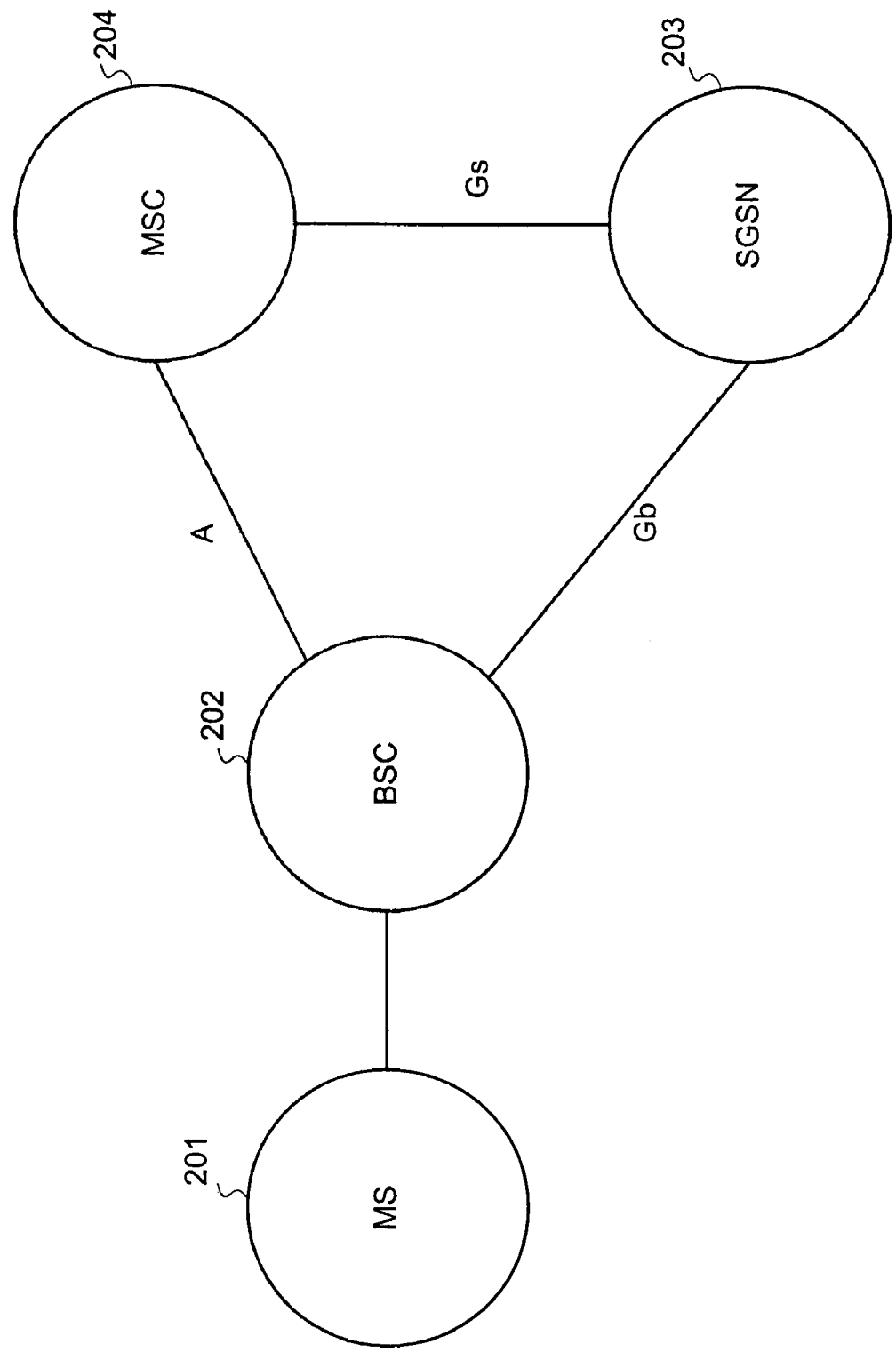
FIG. 2 is a schematic diagram showing a first network operation mode (NOM1) of a GPRS network.
Figure 3:
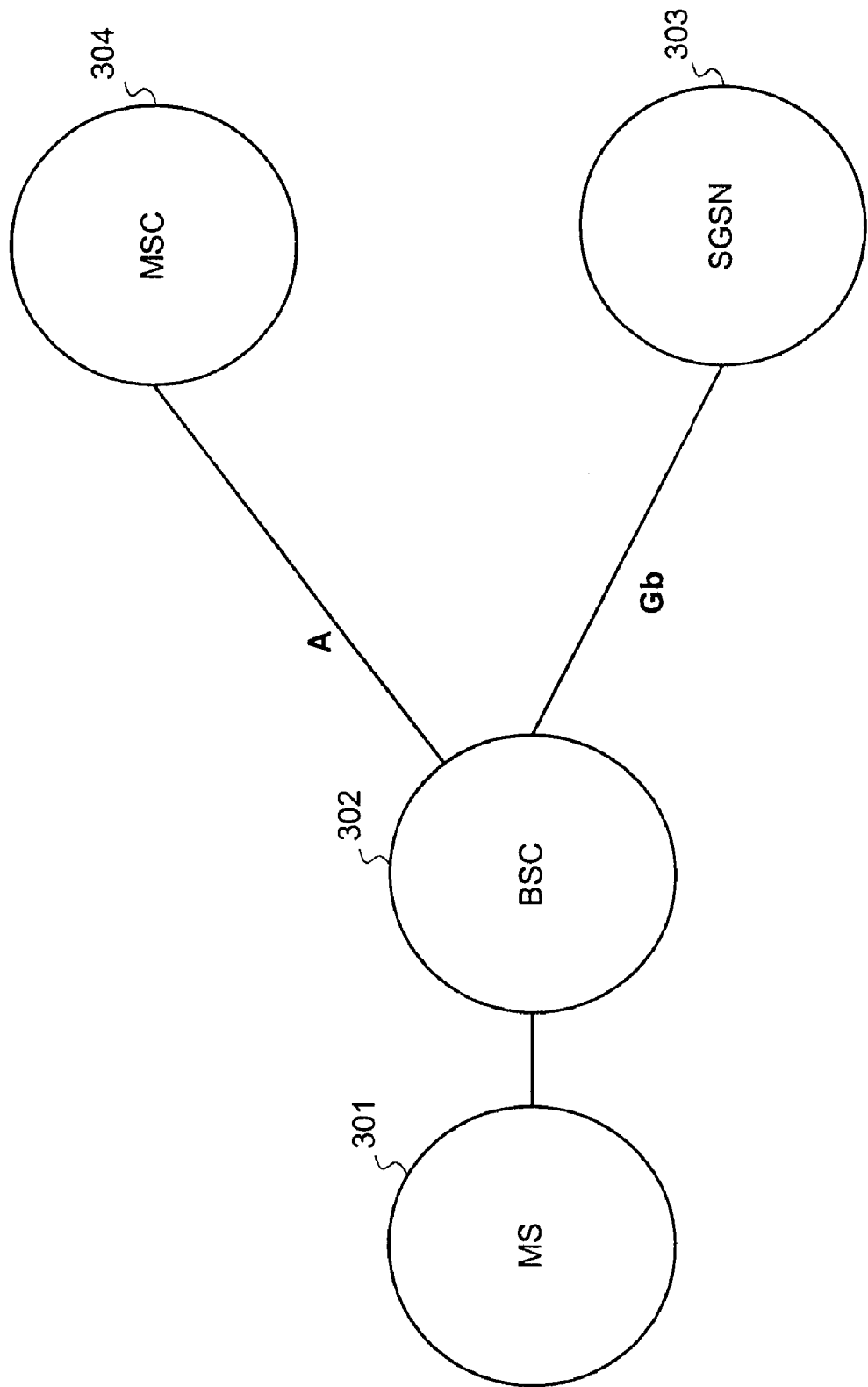
FIG. 3 is a schematic diagram showing a second and third network operation modes (NOM2, NOM 3) of a GPRS network.
Figure 4:
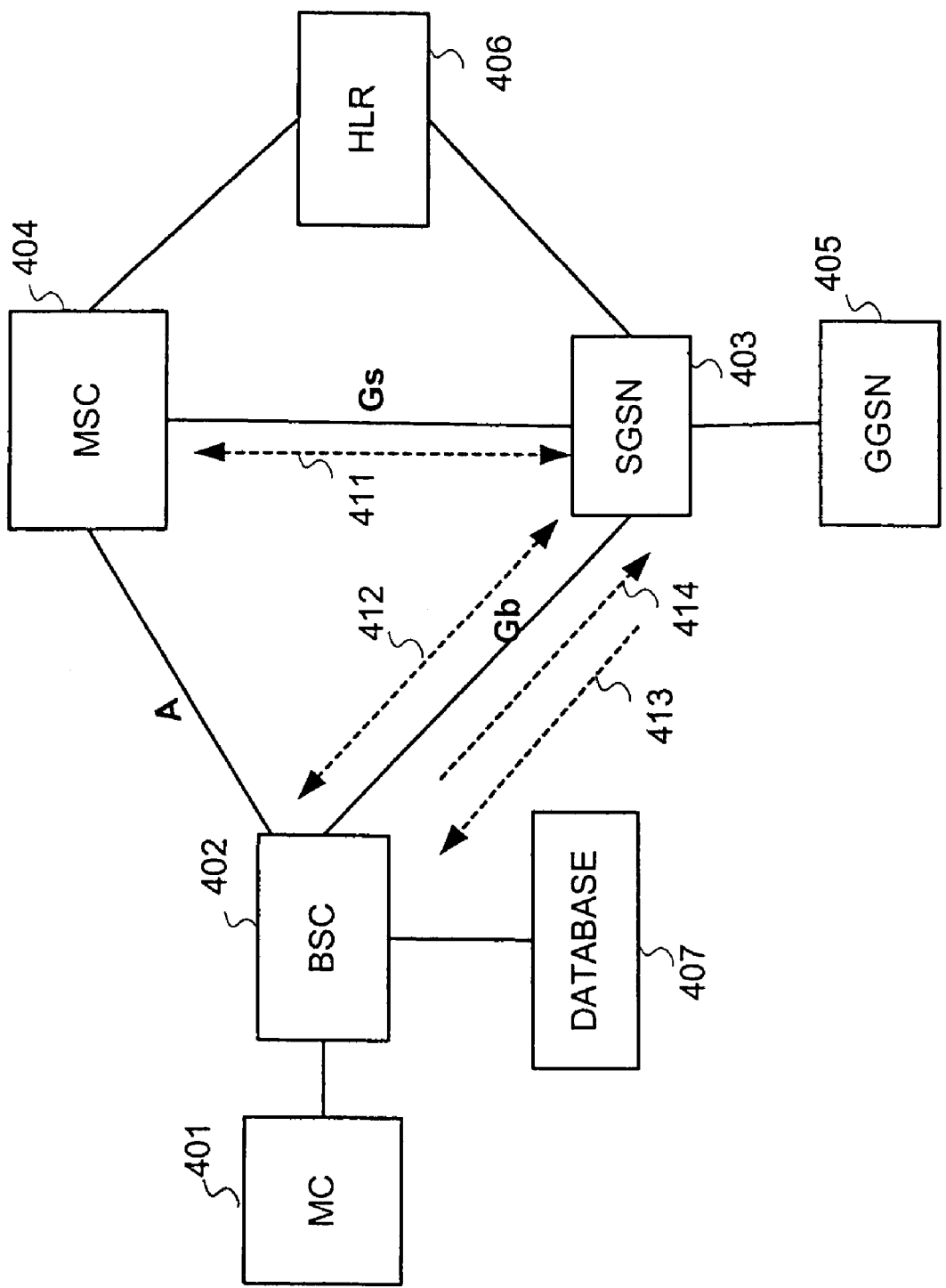
FIG. 4 is a schematic diagram of a system for coordinating operation modes of a GPRS network in accordance with an embodiment of the present invention.

FIG. 4 is a schematic diagram of a system for coordinating operation modes of a GPRS network in accordance with an embodiment of the present invention. The system may include one or more MC's 401 (only one MC is represented), a BSC 402, a MSC 404, a SGSN 403, a GGSN 405, and a HLR 406. BSC 402 manages calls received/transmitted from/to MC 401. MSC 404 is coupled to a GSM network (not shown). SGSN 403 provides packet-switched channels and circuit-switched channels for delivering packet data and voice signals, respectively, between MSC 404 and BSC 402. GGSN 405 serves as a gateway between the GPRS network and other GSM networks. HLR 406 stores information regarding MS subscribers.

The system of the present invention can automatically switch operation modes of the network based on a preferred list of operation modes registered by a MS subscriber. The preferred list is stored in database 407 of BSC 402 which can be uploaded by MS 401 or downloaded from MSC 403. Alternatively, the preferred list may be stored in HLR 406, which is accessible as requested by BSC 402. The preferred list may be, e.g., (1) NOM1 (2) NOM3 (3) NOM2, or just (1) NOM1 (2) NOM2. In operation, BSC 402 may query SGSN 404 or MSC 403 on the status of interface Gs (that is between SGSN 404 and MSC 403) to ascertain what operation mode to transmit. SGSN 404 or MSC 403 can also signal BSC 402 when a change in status of interface Gs occurs, so that BSC 402 can adjust its transmitted operation mode. With the list concept, BSC can also adjust the transmitted operation mode if interface Gb (that is between SGSN 404 and BSC 402) failure occurs.

For example, if a primary operation mode of MS 401 is NOM1, the network will transmit signals in NOM1, that is, voice signals and packet data from the network are transmitted from MSC 403 to SGSN 404 and to BSC 402 via interface Gs and Gb, as shown in arrows 411 and 412. When interface Gs is unavailable to transmit the signals, SGSN 404 sends a notice message to BSC 402 indicating the failure, as shown in arrow 413. Upon receiving this message, BSC 402 looks for a secondary operation mode in the preferred list, such as NOM2 in this case, and sends an acknowledge message to SGSN 404 that indicates to use NOM2 for transmission, as shown in arrow 414. Afterward, the signals will be transmitted from MSC 403 to BSC 402 through interface A.

Figure 5:
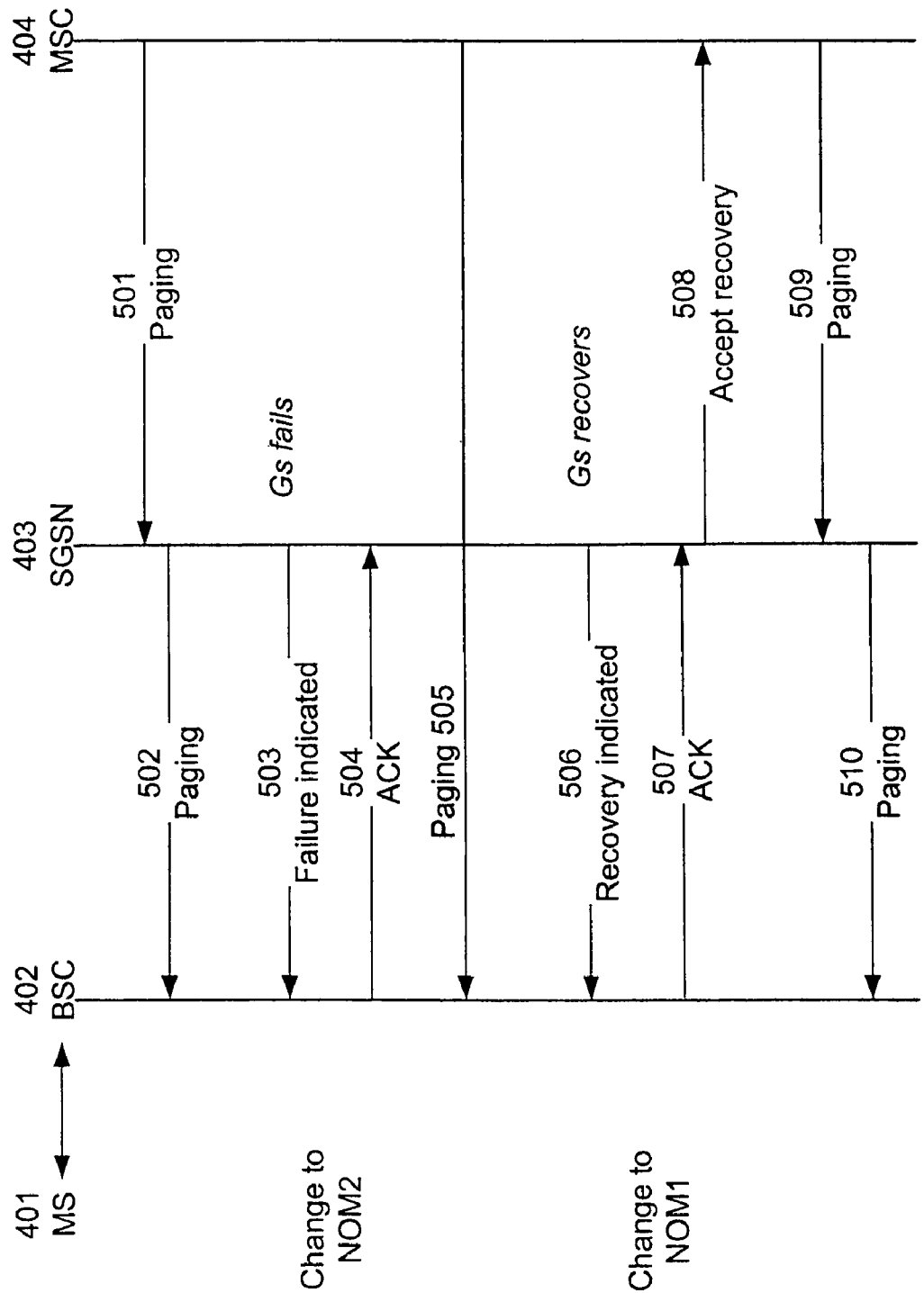
FIG. 5 is a timing diagram for coordinating operating modes of a GPRS network according to a first embodiment of the present invention.

FIG. 5 illustrates a first embodiment of a method employed by the system of FIG. 4 for coordinating operation modes of the GPRS network. Assuming that the network is operated in NOM1 as a primary operation mode, when an incoming call to MS 402 is received by the network, a paging process will be executed from MSC 404 to BSC 402 through SGSN 403. That is, MSC 404 sends a first paging message 501 to SGSN 403, and SGSN 403 in turn sends a second paging message 502 to BSC 402. The second paging message is then downloaded from BSC 402 to MS 401 (shown in FIG. 4) for notifying MS 402 of a new incoming call.

In the case that interface Gs fails, SGSN 403 sends a failure indicated message 503 to BSC 402. Upon receiving this failure indicated message, BSC 402 looks for a secondary operation mode (i.e., NOM2 in this example) from the preferred list stored in its database. BSC 402 in turn responds to the failure indicated message by sending an acknowledge message 504 to SGSN 403. The acknowledge message further instructs SGSN 403 to use the NOM2 for transmission. After receiving this instruction, MSC 404 sends paging message 505 to BSC 402 directly via PPCH of interface A, as in NOM2, until interface Gs recovers.

Once interface Gs recovers, SGSN 403 sends a recovery indicated message 506 to BSC 402, indicating that the operation mode can be returned to NOM1. BSC 402 responds to this recovery message by sending an acknowledge message 507 to SGSN 403 to accept this recovery. SGSN 403 in turn sends an accept recovery message 508 to MSC 404, indicating that BSC 402 has switched back to NOM1. Afterward, MSC 404 again transmits paging message to BSC 402 through SGSN 403, as shown in arrows 509 and 510.

The above embodiment shows that SGSN 403 reports a change of the status of interface Gs to BSC 402 so that BSC 402 can automatically switch the network operation mode to a next preferred operation mode according to the preferred list stored in database 407. Although not shown in this figure, when BSC 402 wishes to send a call to the GPRS network, BSC 402 can also send a query to either SGSN 403 or MSC 404 to ask for the status of interface Gs so that BSC 402 can send the call in an appropriate network operation mode.

Figure 6:
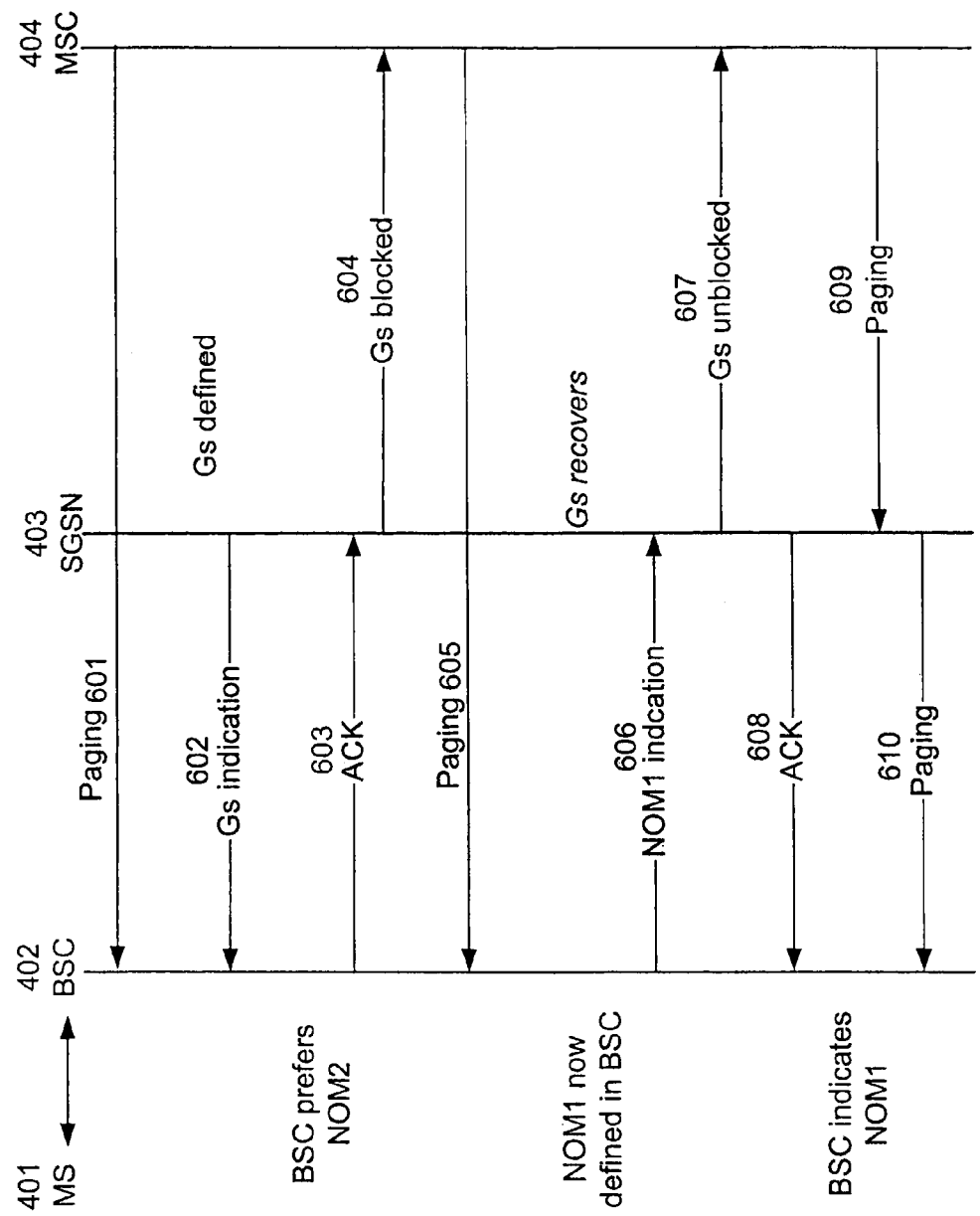
FIG. 6 is timing diagram for coordinating operating modes of a GPRS network according to a second embodiment of the present invention.

FIG. 6 shows a second embodiment of a method employed by the system of FIG. 4 for coordinating operation modes of a GPRS network. In this embodiment, BSC 402 prefers to use NOM2 for signal transmission. Therefore, as shown in arrow 601, the paging message is sent from MSC 404 to BSC 402.

As SGSN 403 is responsible for reporting a change of the status of interface Gs to BSC 402, when interface Gs exists, SGSN 403 sends a Gs indication message 602 to BSC 402. If MS 402 is a class B MS, MS 402 can only listen to voice signals from circuit-switching channels or packet data from packet signaling channels at a time. However, in some cases, e.g., when MS 402 is a class A MS, MS 402 may simultaneously pick up voice signals and packet data which is transmitted from packet signaling channels provided by SGSN 403.

To prevent this from happening, BSC 402 needs to send an acknowledge signal to SGSN 403, in arrow 603 and instruct SGSN to block interface Gs, as shown in arrow 604. In this manner, the method can assure that the paging message is sent from MSC 404 to BSC 402 under NOM2, as shown in arrow 605.

The embodiment of FIG. 6 is applicable when MS 401 is a class A MS that is registered to use NOM2 as its primary operation mode. If MS 401 is also registered to use NOM1 for transmitting/receiving packet data, MS 401 can manually request a connection to NOM1. As shown in arrow 606, in this case, BSC 402 sends a NOM1-request message to SGSN 403. Upon receiving this message 601, SGSN 403 sends a Gs-unblocked message 607 to MSC 404 indicating that the operation mode has been changed to NOM1, and sends an acknowledge message 608 to BSC 402 indicating interface Gs is now unblocked and a change to NOM1 is completed. Afterward, MSC 404 transmits the paging message in the manner of NOM1; that is, the paging message is sent from MSC 404 to SGSN 403, in arrow 609, and then to BSC 402, in arrow 610.

Accordingly, the method and system in accordance with the present invention provide a flexible management of network operation modes based on the registered preferred list of the MS and the status of interface Gs. As SGSN 403 is capable of reporting any change of the status of interface Gs, BSC 402 has controls on what operation mode to use to route the signals.

The methods as described with reference to FIGS. 5 and 6 provide a solution for coordinating operation modes of the GPRS network. In some cases, due to call-processing problems, a network indicating NOM1 cannot actually perform coordinated signaling as it should have. When this happens, MS 402 is unable to listen to the right channels and so mistakes occur. To prevent this from happening, the network needs to ensure that NOM1 is only transmitted when coordination is possible. In doing so, another embodiment of the present invention reserves a BTS Virtual Connection Identifier (BVCI) between BSC 402 and SGSN 403 for indicating the status of NOM1. The BVCI is unblocked if the network is able to perform signaling coordination (i.e., NOM1 is possible) and would be blocked or leave blocked if the signaling coordination is impossible (i.e., NOM1 is failed).

Figure 7:
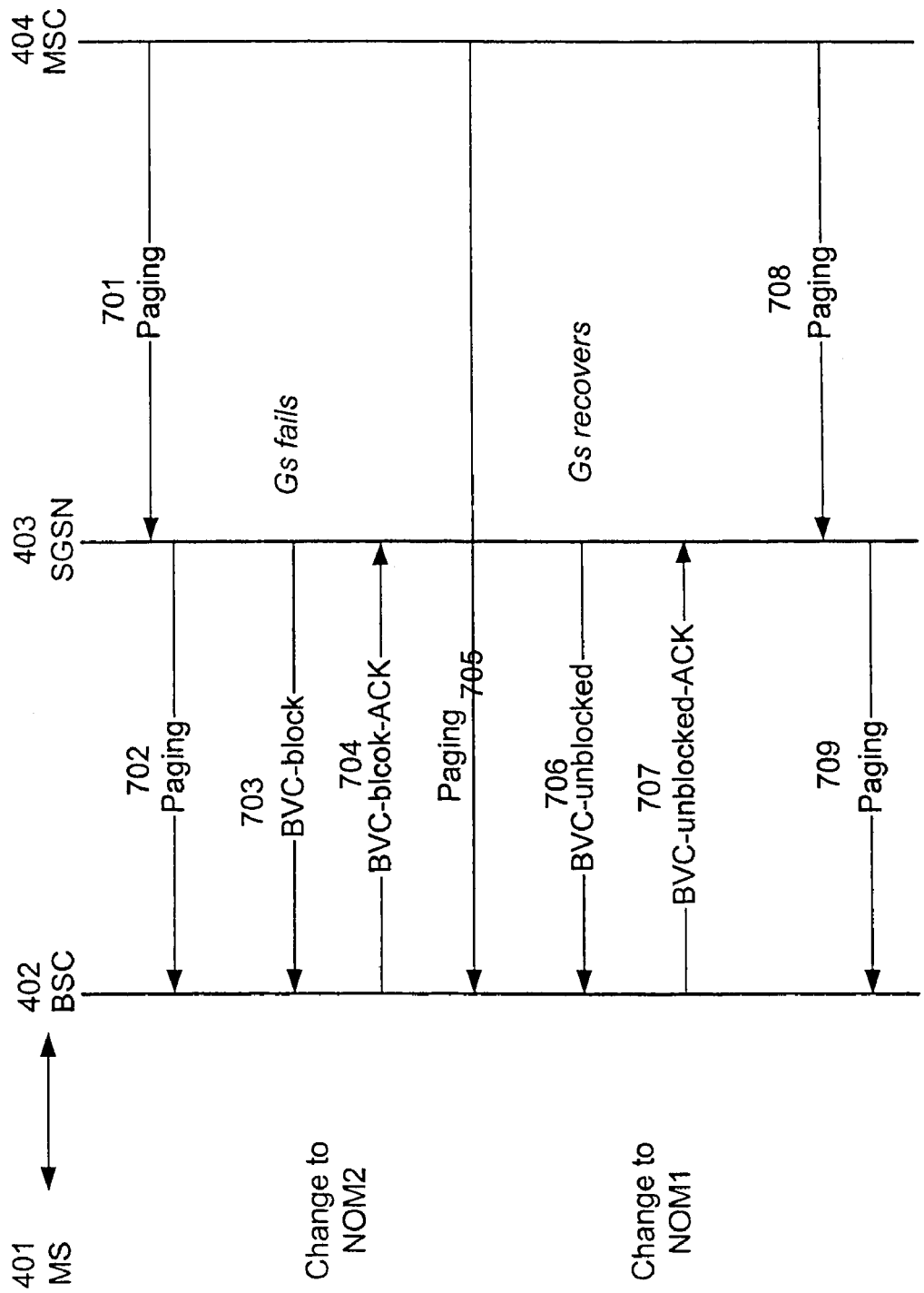
FIG. 7 is timing diagram for coordinating operating modes of a GPRS network according to a third embodiment of the present invention.
Figure 8:
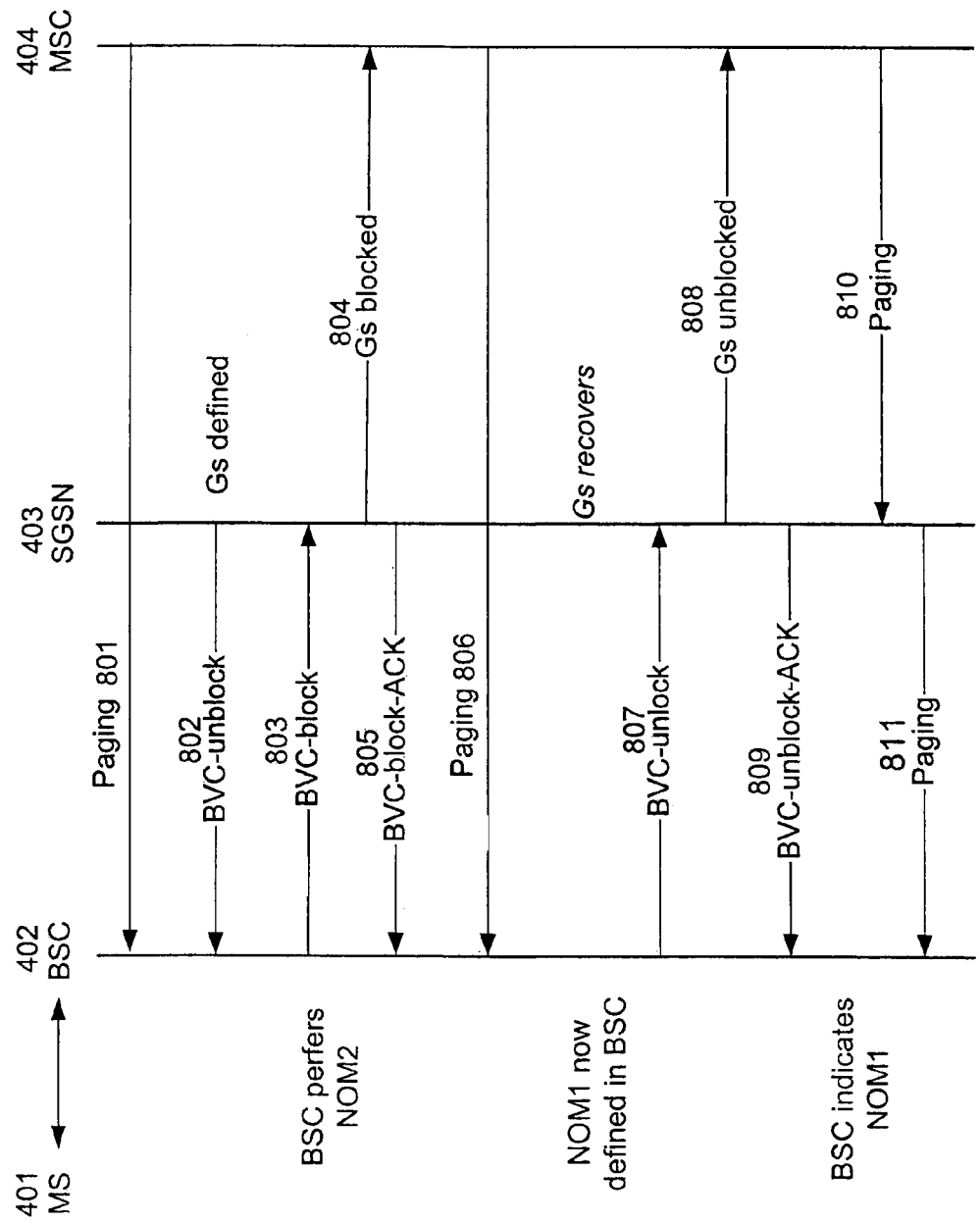
FIG. 8 is a timing diagram for coordinating operating modes of a GPRS network according to a fourth embodiment of the present invention.
Figure 9:
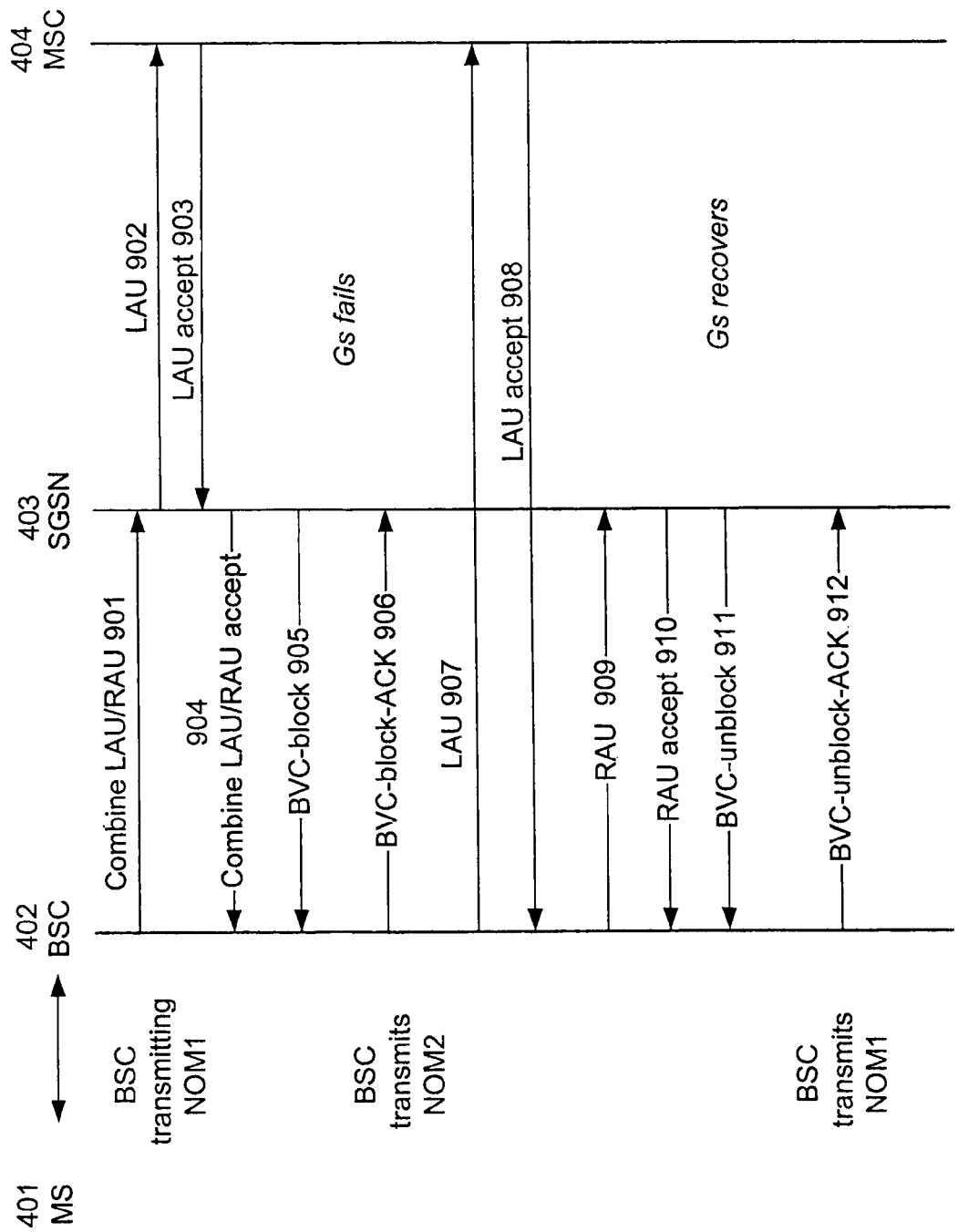
FIG. 9 is a timing diagram for coordinating operating modes of a GPRS network according to a fifth embodiment of the present invention.

Therefore, by applying the BVCI, the methods of FIGS. 5 and 6 employed by the system of the present invention can be revised to be the embodiments as shown in FIGS. 7 and 8.

FIG. 7 illustrates a third embodiment revised from the method of FIG. 5 after embodying the BVCI concept. Similar to the embodiment of FIG. 5, NOM1 is the primary operation mode and NOM2 is the secondary operation mode. Therefore, as shown in arrows 701 and 702, in NOM1, paging messages are sent from MSC 404 to SGSN 403 and from SGSN 403 to BSC 402.

When interface Gs fails, instead of sending the failure indication message, SGSN 403 sends a BVCI-blocked message 703 to BSC 402 indicating that interface Gs fails and NOM1 is no longer available. In response to the BVCI-block message 703, BSC 402 looks for the secondary operation mode (i.e., NOM2) from the preferred list stored in database 407 and sends a BVC-blocked acknowledge message 704 to SGSN 403 indicating that NOM2 should be used. After receiving this acknowledge message, MSC 404 sends the paging messages to BSC via interface A, as is in NOM2.

Similarly, when interface Gs recovers, SGSN 403 sends a BVCI-unblocked message 706 to BSC 402 indicating that NOM1 is now available. BSC 402 in turn responds to this message by sending a BVCI-unblocked acknowledge message 707 indicating that the recovery is accepted. Afterward, MSC 404 sends the paging messages to BSC 402 through SGSN 403, i.e., through interface Gs and Gb, as shown in arrows 708 and 709.

FIG. 8 shows a fourth embodiment revised from the method of FIG. 6 after embodying the BVCI concept. Similar to the embodiment of FIG. 6, NOM2 is the primary operation mode and MS 401 can be also used in NOM1 as well. Therefore, as shown in arrows 801, in NOM2, paging messages are sent from MSC 404 to BSC 402 via interface A.

As described above, SGSN 403 reports a change of the status of interface Gs to BSC 402 whenever the change occurs. When interface Gs exists, for example, when MS 402 moves into a location area where interface Gs is available, SGSN 403 reports this situation by sending a BVCI-unblocked message 802 to BSC 402. If the primary network operation mode of MS 401 is NOM2, BSC 402 will in turn send a BVCI-block request message 803 to SGSN 403 instructing SGSN 403 to block interface Gs. SGSN 403 then sends a Gs blocked message 804 to MSC 404. Upon receiving this Gs block message, MSC 404 continues to send paging messages to BSC 402 through interface A.

When MS 401 wants to send packet data through interfaces Gs and Gb (i.e., using NOM1), BSC 402 requests a BVCI-unblocked message 807 to SGSN 403. Upon receiving this message, SGSN 403 sends a Gs unblocked message to MSC 404, as shown in arrow 808. SGSN 403 also sends a BVCI-unblock acknowledge message 809 to BSC 402 indicating that interface Gs is now unblocked and a switch to NOM1 is completed. Next, MSC 404 transmits the paging messages through SGSN 403, i.e., through interface Gs and Gb, as shown in arrows 810 and 811.

In accordance with the present invention, the use of the BVCI ensures that the network can be used in NOM1 when NOM1 is indicated available. As the present invention reserves a singular BVCI value of the existing BVC to indicate the availability of NOM1, the use of BVCI does not change the protocol of the existing GPRS network.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The invention claimed is:

1. A method, for coordinating modes of a general packet radio service network, comprising:

obtaining, at a base station controller, a preference-ordered list of operation modes established by a user of a mobile device, wherein the preference-ordered list of operation modes includes a first network operation mode, a second network operation mode, and a third network operation mode, ordered, according to user preferences, from a most preferred operation mode to a least preferred operation mode;

obtaining, at the base station controller, a present status of a Gs link between a serving general packet radio service support node and a mobile switching center of the general packet radio service network; and selecting, in response to the present status of the Gs link of the general packet radio service network, an operation mode from the preference-ordered list based on the user preferences and the present status;

wherein selecting the operation mode from the preference-ordered list of operation modes is performed by a component selected from a group of components consisting of the base station controller and the serving general packet radio service support node.

2. The method of claim 1, further comprising sending, from the base station controller, an operation mode message to the serving general packet radio service support node indicating the operation mode selected based on the preferences and the present status.

3. The method of claim 1, further comprising sending, from the base station controller, to the serving general packet radio service support node a query for status of the Gs link between the general packet radio service support node and the mobile switching center of the general packet radio service network, wherein the base station controller obtains the present status in response to the query.

4. The method of claim 1, further comprising sending, from the base station controller, to the mobile switching center a query for status of the Gs link between the serving general packet radio service support node and the mobile switching center of the general packet radio service network, wherein the base station controller obtains the present status in response to the query.

5. The method of claim 1, wherein the base station controller obtains the present status of the Gs link between the serving general packet radio service support node and the mobile switching center without having sent a query to the mobile switching center or the serving general packet radio service support node for the present status.

6. The method of claim 1, further comprising monitoring the Gs link between the serving general packet radio service support node and the mobile switching center to determine whether the present status exists.

7. The method of claim 1, wherein the obtaining the present status of the Gs link includes receiving the present status from the serving general packet radio service support node in response to the serving general packet radio service support node having determined that the present status is different than a previous status.

8. The method of claim 1, wherein the obtaining the present status of the Gs link includes receiving the present status from the mobile switching center in response to the serving general packet radio service support node having determined that the present status is different than a previous status.

9. The method of claim 1, wherein selecting the operation mode from the preference-ordered list of operation modes includes the base station controller retrieving the preference-ordered list of operation modes from a database selected from a group of databases consisting of:

a database of the base station controller;

a database of the mobile switching center; and a home location register of the general packet radio service network.

10. A base station controller for coordinating operation modes of a general packet radio service network, the base station controller including a processor and a non-transitory, computer-readable storage medium storing instructions that, when executed by the processor, cause the processor to perform a method comprising:

obtaining a preference-ordered list of operation modes established by a user of a mobile device, wherein the preference-ordered list of operation modes includes a first network operation mode, a second network operation mode, and a third network operation mode, ordered, according to user preferences, from a most preferred operation mode to a least preferred operation mode;

obtaining a present status of a Gs link between a serving general packet radio service support node and a mobile switching center of the general packet radio service network; and selecting, in response to the present status of the Gs link of the general packet radio service network, an operation mode from the preference-ordered list of operation modes based on the user preferences and the present status.

11. The base station controller of claim 10, wherein the instructions further cause the processor to send an operation mode message to the general packet radio service support node indicating the operation mode selected based on the present status of the Gs link.

12. The base station controller of claim 10, wherein the instructions further cause the processor to send a query to the serving general packet radio service support node for status of the Gs link between the serving general packet radio service support node and the mobile switching center of the general packet radio service network, wherein the base station controller obtains the present status in response to the query.

13. The base station controller of claim 10, wherein the instructions further cause the processor to send a query to the mobile switching center for status of the Gs link between the serving general packet radio service support node and the mobile switching center of the general packet radio service network, wherein the base station controller obtains the present status in response to the query.

14. The base station controller of claim 10, wherein the instructions further cause the processor to obtain the present status of the Gs link between the general packet radio service support node and the mobile switching center without having sent a query to the mobile switching center or general packet radio service support node for the present status.

15. The base station controller of claim 10, wherein, in being configured to obtain the preference-ordered list of operation modes, the base station controller is configured to obtain the list from the mobile switching center.

16. The base station controller of claim 10, wherein, in being configured to obtain the preference-ordered list of operation modes, the base station controller is configured to obtain the list from a home location register of the general packet radio service network.

17. A non-transitory computer-readable storage medium, for use in a base station controller, storing instructions that, when executed by a processor, cause the processor to perform a method comprising:

obtaining a preference-ordered list of operation modes established by a user of a mobile device, wherein the preference-ordered list of operation modes includes a first network operation mode, a second network operation mode, and a third network operation mode, ordered, according to user preferences, from a most preferred operation mode to a least preferred operation mode;

obtaining a present status of a Gs link between a serving general packet radio service support node and a mobile switching center of the general packet radio service network; and selecting, in response to the present status of the Gs link of the general packet radio service network, an operation mode from the preference-ordered listed of operation modes based on the user preferences and the present status.

* * * * *